Jan. 30, 1923.
L. C. MARSHALL.
PACKING RING FOR PISTONS.
FILED SEPT. 17, 1921.
1,443,755
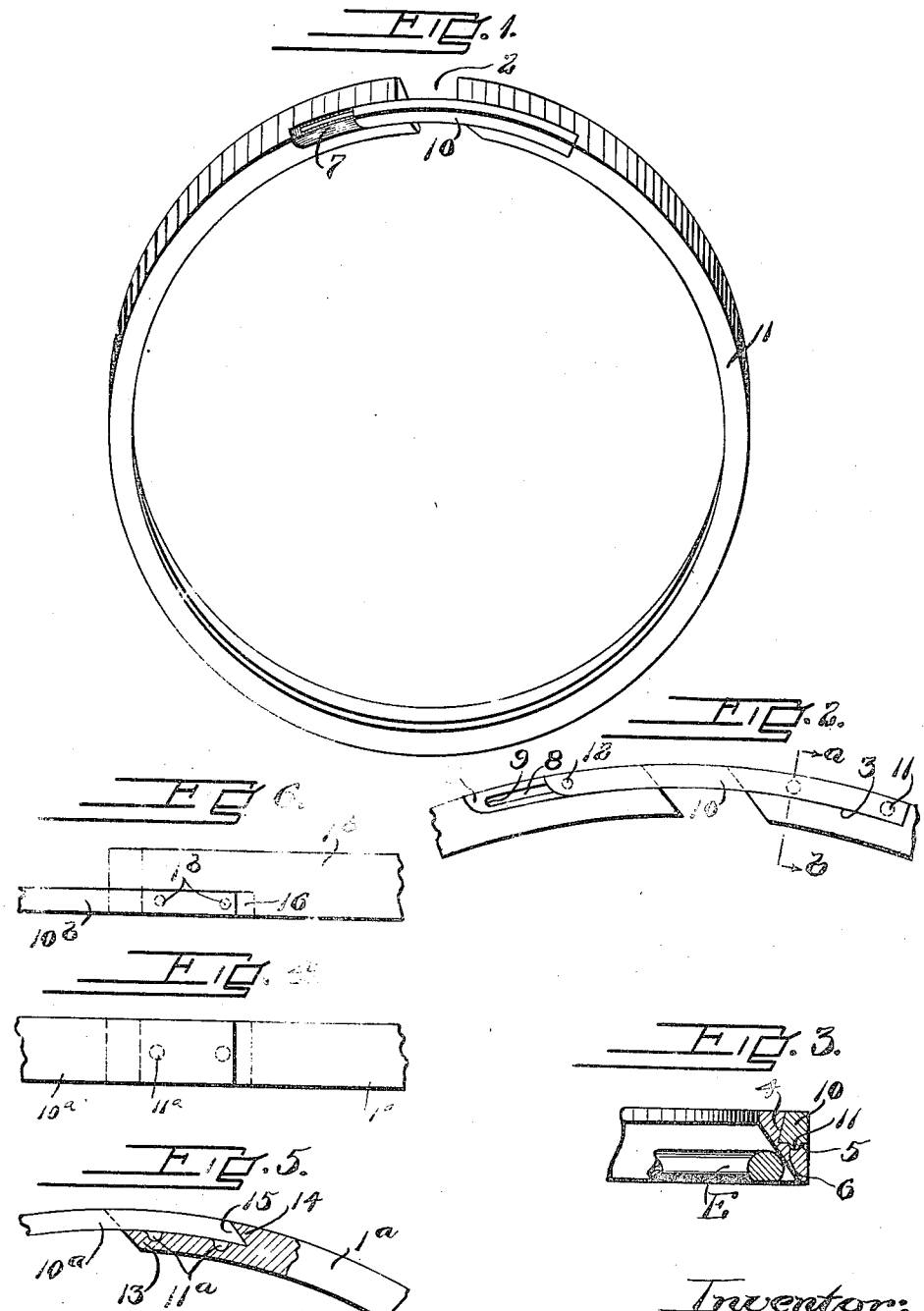
Inventor:
Lewis C. Marshall
by Roberts, Roberts & Cushman
his attys.

Patented Jan. 30, 1923.

1,443,755

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PACKING RING FOR PISTONS.

Application filed September 17, 1921. Serial No. 501,380.

*To all whom it may concern:*

Be it known that I, LEWIS C. MARSHALL, a citizen of the United States of America, and resident of Walpole, in the county of Norfolk and State of Massachusetts, have invented new and useful Improvements in Packing Rings for Pistons, of which the following is a specification.

This invention concerns piston packings and relates more particularly to metallic packings comprising split rings and such as are commonly employed in internal combustion engines.

Rings of this character are at times provided with secondary, or expander rings of resilient material and normally engaging the inner peripheral surface of the main ring whereby to augment the natural tendency of such main ring to expand radially. In assembling such rings the split or gap in the main ring permits the latter to expand to an unnecessary degree so that the expander ring frequently slips out of place before the composite ring can be placed in the piston groove.

The gap in the main ring is necessary for allowing for expansion of the same, but such gap, in addition to allowing excessive expansion, also permits leakage of gas from one side of the ring to the other.

The object of the present invention is to provide a split ring of a type such as to facilitate the assemblage of an expander ring therewith and which at the same time will be substantially free from leakage at the gap therein and possess the requisite resiliency.

In accordance with the present invention this object may well be attained by providing the opposed ends of the ring with circumferentially aligned slots in one edge face thereof. One of said slots may be undercut and its radial face may be provided with one or more sockets or depressions while the corresponding surface of the other slot may have an elongated, circumferentially extending groove therein. A tongue member, which may well be made as a die-casting, may be snapped into the slot having the socket openings, such tongue member having tits engageable with the respective sockets. Such tongue member may also have a tit or protuberance engageable with the groove in the face of the opposite notch. The tongue member as thus arranged is fast to one end of the ring while free to move to a limited extent relatively to the other end thereof. As thus constructed, the ring has an adequate overlap capable of preventing leakage of gas to any substantial extent, while no riveting or other mechanical operation is necessary to secure the tongue in position. Moreover, as the tongue member limits expansion of the main ring, it is substantially impossible for a secondary or spring ring when once assembled with the main ring to escape therefrom during the placing of the packing in the piston groove.

In the accompanying drawings there is shown by way of example a preferred arrangement of parts whereby the above objects may be attained, and in which,—

Fig. 1 is a perspective view of a packing ring constructed in accordance with the present invention;

Fig. 2 is a fragmentary side elevation of the ring at that portion thereof having the gap therein and illustrating means employed for connecting the ends of the ring;

Fig. 3 is a cross section on the line *a—b* of Fig. 2;

Fig. 4 is a fragmentary, circumferential edge view of a ring having a connector tongue of somewhat modified form;

Fig. 5 is a central, radial section through the parts shown in Fig. 4; and

Fig. 6 is a view similar to Fig. 4 but illustrating a further modification.

The packing ring 1 is, except as hereinafter pointed out, of usual construction, such ring being of cast iron if desired, or other suitable material and having a gap at 2. As hereinafter indicated, the ends of the ring are beveled to provide a lap joint but other forms of joint might well be employed without in any manner departing from the present invention.

This ring may have associated therewith an expander ring E of usual form and construction, such ring engaging the inner surface of the main ring and serving to augment the tendency of the latter to expand radially.

In order to provide for limiting expansion of the main ring as well as to secure a long lap for the joint therein, one edge of the main ring is provided with a slot 3 extending circumferentially thereof. This slot is undercut as indicated at 4 and the radial wall 5 thereof is furnished with one or more socket openings 6. The opposite end of the ring is provided with a slot 7 aligned with the first-named slot, the slot 7 however, being furnished upon its inner radial wall with an elongated groove 8, the groove 8 ending in abrupt walls such as 9. The tongue member 10 may be a die-casting if desired and is so shaped as to fit snugly within the slot having the socket openings 6, such tongue member being provided with projections or tits 11 engageable with the sockets 6. By reason of the provision of the members 11, the undercut formation of the slot and the natural resiliency of the metal of the ring, the tongue member interlocks with the ring and when snapped into position within the slot is retained therein without necessitating the employment of further fastening means.

Near its other end, the tongue 10 is provided with a tit 12 which engages within the groove 8 and which may abut against either of the end walls 9 thereof. As thus arranged, the tongue 10 serves to connect the ends of the main ring, furnishing a continuous circumferential surface for engagement with the cylinder wall whereby leakage past the piston ring is substantially eliminated. The mode of securing such tongue in position makes it unnecessary to use rivets or other fastening means, the employment of which would require great care and skill due to the thinness and somewhat brittle character of the metal involved, and thus the cost of production is not unduly increased.

As the tongue member 10 has sliding engagement with one end of the main ring, it is evident that the radial expansion of the latter is not unduly interfered with, while at the same time the engagement of the member 12 with the end 8 serves to prevent excessive expansion of the main ring before assembly in the cylinder, thus preventing escape of the expander ring.

In the arrangement shown in Figs. 4 and 5, the tongue 10$^a$ is of the same axial width as the ring 1$^a$ and at its end the latter is thinned down as indicated at 13, such thinned portion ending in an undercut shoulder 14 with which the beveled end 15 of the tongue member engages. The tongue member is provided with one or more projecting tits 11$^a$ engaging suitable socket openings in the member 13 of the ring. The ring and tongue are accurately machined, and when assembled, the tongue projects beneath the shoulder 14 and the tits 11$^a$ snap into their sockets thus holding the parts in proper relative position without necessitating other fastening means.

In Fig. 6 a slight modification of the arrangement shown in Figs. 4 and 5 is illustrated, the tongue 10$^b$ in this case being of less axial width than the ring 1$^b$ and being seated in a slot in the latter. The end of such slot is undercut as indicated by dotted lines at 16 in Fig. 6 and the tongue member is provided with a beveled end which fits beneath such undercut portion of the ring. The tongue in this case is also furnished with projections 11$^b$ which are snapped into sockets in the ring for retaining the tongue in position.

While the present invention, above described, has been illustrated as embodied in a packing ring having a beveled inner face, it is evident that it is not confined to this particular type of ring but that it might be embodied in rings of other form having associated therewith any suitable form of expander ring, as desired. It is also clear that the tongue member might well be employed with a packing ring not provided with an expander ring, such tongue serving in any case to provide a continuous circumferential ring surface.

I claim:

1. A piston ring having a gap therein, and a tongue member resiliently clamped to one end of said ring and extending across the gap and into sliding engagement with the other end of the ring.

2. A piston ring having a gap therein, a member projecting from one end of said ring across the gap and into engagement with the other end of the ring, said member having resilient interengagement with elements of the first named end of the ring, and means for limiting relative movement of said member and said last named end.

3. A piston ring having a gap therein, a member resiliently clamped to one end of the ring and projecting across said gap from one end of the ring, and engageable elements carried by said member and the other end of the ring respectively for limiting relative movement of said member and the last named end of the ring.

4. A piston ring having a gap therein, one end of said ring having an undercut, circumferential slot therein, and a tongue member constructed and arranged to be seated in said slot, said tongue member having outstanding projections engageable with sockets in a wall of said slot.

5. A piston ring having a gap therein, the ends of said ring having undercut, circumferentially aligned slots in one edge thereof, one of said slots having a socket opening in one of its faces, and the other slot having an elongated groove in one face, and a tongue member having a projecting tit engageable with said socket for retaining said member when seated in the slot at one end of the ring, and a second tit engageable with said groove for limiting circumferential movement of said tongue relatively to the other end of the ring.

6. A piston ring having a gap therein, one end of said ring having an undercut, circumferentially extending slot in one edge thereof, and a tongue member fitting tightly in said slot and having a portion extending across the gap and into engagement with the opposite end of the ring.

7. A piston ring having a gap therein, the opposed ends of the ring having aligned, circumferentially extending slots in one face thereof, and a tongue member resiliently held in the slot in one of said ends and having a portion extending across said gap and into sliding engagement with the slot in the other end.

Signed by me at Boston, Massachusetts, this seventh day of September, 1921.

LEWIS C. MARSHALL.